Feb. 6, 1973    W. J. STEIN ET AL    3,714,779
GAS TURBINE ENGINE HAVING A HORIZONTAL
ACCESSORY GEAR BOX
Filed Sept. 28, 1970    5 Sheets-Sheet 1

INVENTORS.
WOLFGANG J. STEIN
RICHARD AINSWORTH
BY HORST D. BERKNER

Charles M. Hogan
Gary M. Gron
ATTORNEYS.

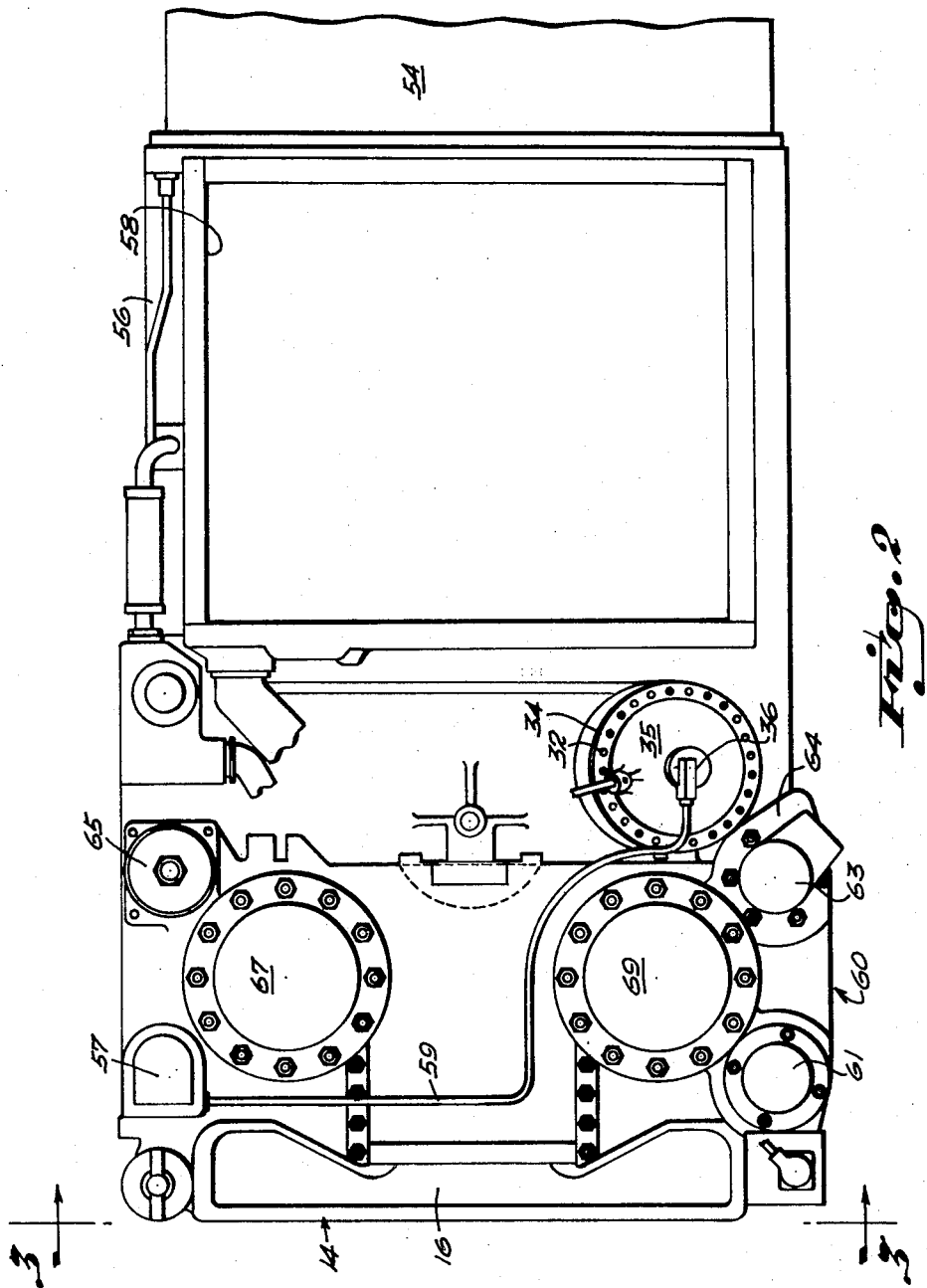

INVENTORS.
WOLFGANG J. STEIN
RICHARD AINSWORTH
BY HORST D. BERKNER

ATTORNEYS

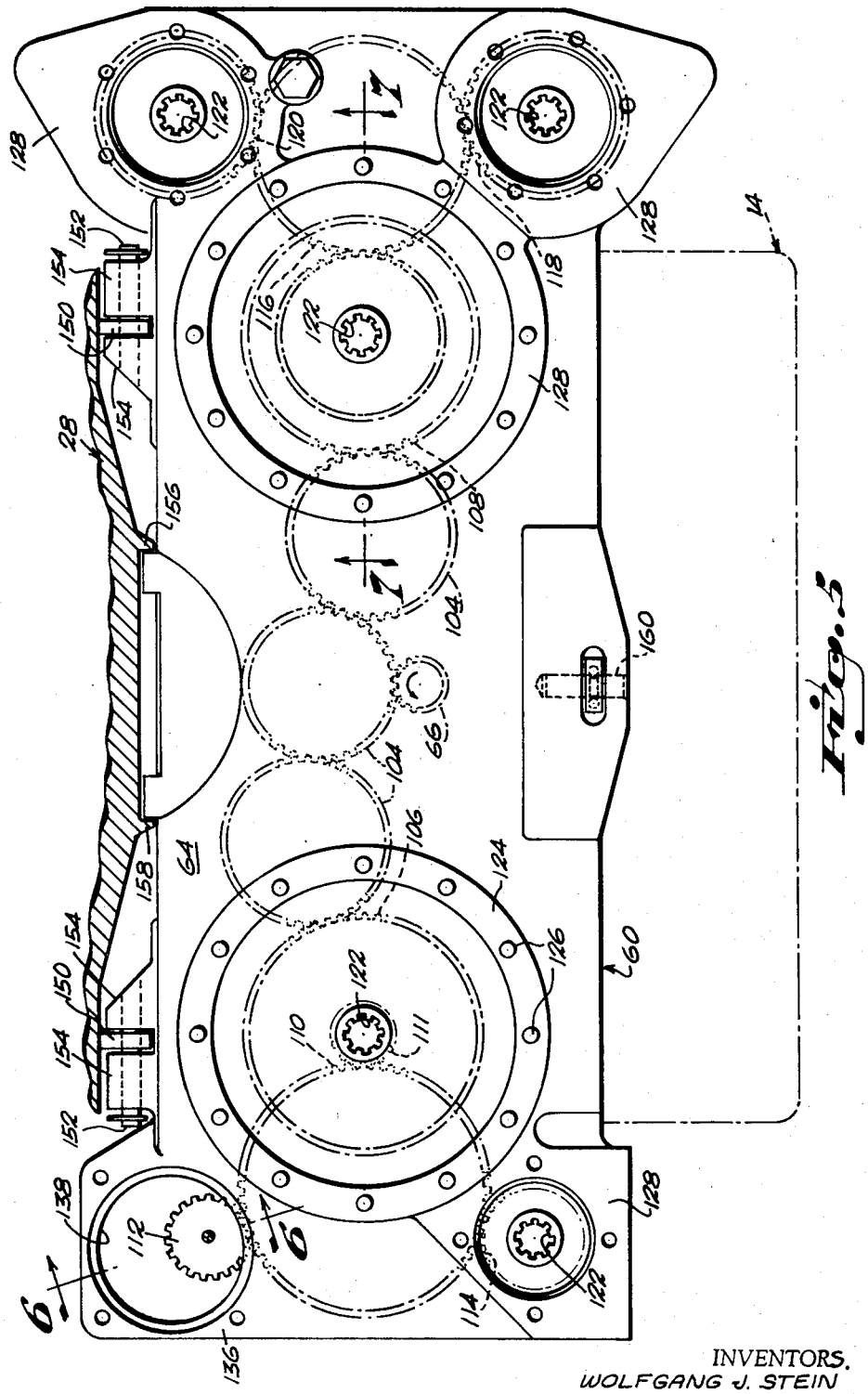

United States Patent Office 3,714,779
Patented Feb. 6, 1973

3,714,779
GAS TURBINE ENGINE HAVING A HORIZONTAL ACCESSORY GEAR BOX
Wolfgang J. Stein, Milford, Richard Ainsworth, Huntington, and Horst D. Berkner, Stratford, Conn., assignors to Avco Corporation, Stratford, Conn.
Filed Sept. 28, 1970, Ser. No. 76,014
Int. Cl. F02c 7/20
U.S. Cl. 60—39.31     12 Claims

ABSTRACT OF THE DISCLOSURE

The disclosure illustrates a gas turbine engine providing a high degree of vertical accessibility to the engine and its important components. This accessibility is provided by employing a horiozntally positioned accessory gear box supported underneath the engine and having the accessories mounted on its upper surface. The gear box is supported from the engine housing so that the two components are free to thermally expand relative to one another. Vertically directed intake, exhaust and tangential single can combustor also contribute to the accessibility.

---

This invention relates to gas turbine engines and more specifically to gas turbine engines employed as prime movers for vehicles.

Over the years the gas turbine engine has been used extensively for propulsion of aircraft. For this purpose engines are designed to provide a minimum frontal area. This is done to decrease the parasitic aerodynamic drag of the engine itself. In achieving a low frontal area engine, designers have connected the engine accessories in such a fashion that they hug the generally cylindrical compressor casing of the engine.

While providing a highly efficient arrangement in an aircraft, this type of engine design creates substantial problems when it is employed in a surface vehicles. Surface vehicles often are designed so that access to the engine is extremely limited. This makes it necessary with conventional gas turbine engines to remove the entire engine from the vehicle for even minor replacement of components.

An extreme example of limited accessibility may be found in the use of the gas turbine engine to propel a tank. Generally in the design of a tank two factors are of paramount importance. The first is to have a maximum fuel capacity for maximum range. The second is to provide an arrangement that affords maximum protection for the engine used to power the vehicle. In achieving these ends tank designers have generally straddled the engine with fuel tanks so that accessbility from the sides is cut off. In addition, the engine is almost encased in steel plate. With such an arrangement it is almost impossible to service the accessory components necessary for the engine. Even the most routine replacement requires that the entire engine be removed from the vehicle.

SUMMARY OF THE INVENTION

The invention eliminates the above problems by providing in a gas turbine engine an accessory gear box that extends from both sides of the engine and has an upper generally horizontal mounting surface. An input gear is driven by the gas turbine engine rotor. A train of gears, each having a vertical axis of rotation, is driven by the input gear. A means is provided for detachably mounting accessories on the horizontal surface for driving engagement with the gears. This enables the accessories to be maintained on the horizontal surface by gravity during installation or removal.

The above and other related features of the present invention will be apparent from a reading of the description shown in the accompanying drawings and the novelty thereof pointed out in the appended claims.

In the drawings:

FIG. 2 is an exterior plan view of the engine shown in FIG. 1 on a slightly reduced scale;

FIG. 3 is a frontal view of the engine shown in FIG. 2, taken on lines 3—3 of FIG. 2;

Figure 1:
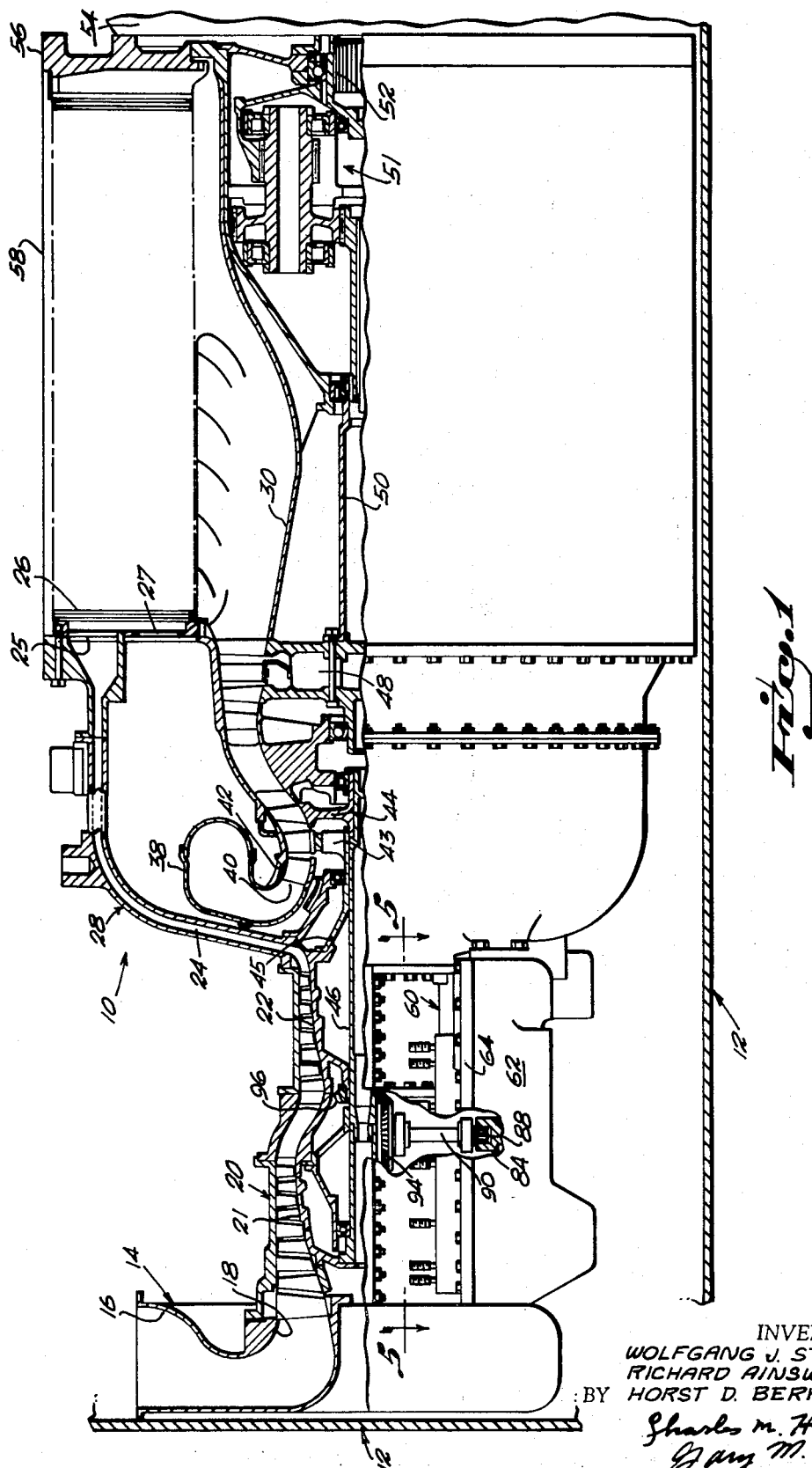
FIG. 1 is a longitudinal view of a gas turbine engine embodying the present invention.

Referring to FIG. 1, there is shown a gas turbine engine 10. The gas turbine engine 10 is employed in an engine compartment 12 that enables vertical accessibility only. The gas turbine engine 10 has an inlet housing 14. The inlet housing 14 has a vertically directed inlet opening 16 (see FIG. 1) and a vertically directed outlet 58. The inlet housing 14 is suitably secured to a compressor housing 20 of the engine 10. The compressor housing 20 has a pair of bladed rotors 21, 22 that receive air from inlet housing 14 and pressurize it for discharge through a radially directed annular diffuser 24 positioned within a combustor casing 28.

The air from the diffuser 24 discharges into a heat exchanger unit, generally indicated by reference character 26. The heat exchanger 26 disclosed herein is the type shown in U.S. Pat. No. 3,424,240, entitled "Corrugated Stacked-Plate Heat Exchanger," in the name of Wolfgang J. Stein et al. and of common assignment to the present invention. Briefly, the heat exchanger in the above patent has a series of formed stacked circular plates having circular openings in the center. The plates are formed with corrugations so that the air from the diffuser 24 passes through generally axially directed openings 25 and passes through circuitous paths in the heat exchanger and exits through an axially directed outlet 27 to the interior of combustor housing 28. The hot exhaust gases for the heat exchanger pass from a turbine outlet duct 30 through generally radially extending passages to the exterior of the heat exchanger. The heat exchanger 26 is surrounded by semicylindrical casing 56 which has an outlet 58 vertically directed (see FIG. 1).

The compressed air that enters the interior of combustor housing 28 passes through openings 32 in a combustor 34 (FIG. 3). Fuel is injected into combustor 34 by a nozzle 36 and the resultant mixture is ignited to provide a propulsive gas stream. Combustor 34 is of the tangential type which connects with an outlet scroll 38. Outlet scroll 38 has an annularly directed outlet 40 which discharges the hot gases across a turbine inlet nozzle 42. The hot gases pass across a first bladed turbine wheel 43 which drives compressor rotor 22 through shaft 45. From there the gases pass across a second bladed turbine wheel 44 which drives compressor rotor 21 via shaft 46. The hot gases then pass across bladed power turbine disks 48 and through duct 30 to the regenerator 26. The power turbine disks 48 are connected by shaft 50 and a suitable gear train 51 to an output shaft 52 which drives transmission 54 for a vehicle.

As shown in FIG. 2, the gas turbine engine 10 has a number of accessory components which are necessary for its operation as a self-contained unit. An integral fuel pressurizing and scheduling unit 57 receives fuel from a suitable source and pressurizes the fuel for controlled delivery through conduit 59 to the fuel nozzle 36. A primary starter 61 and an auxiliary emergency starter 63 are provided to drive the bladed rotor 22 at a sufficient speed to enable combustion to be initiated and maintained in combustor 34. An oil pump-filter assembly 65 pressurizes lubricating fluid for delivery to the bearing assemblies that journal the rotating components of the engine 10. In addition, the engine 10 may provide power for accessories necessary primarily for an auxiliary purpose in the vehicle powered by the engine 10. These accessories are a hydraulic pump 67 and an alternator or generator 69.

These accessories are mounted on an accessory gear box 60 which comprises a lower casing 62 extending laterally from the underside of the compressor housing 20. Gear box 60 has an upper cover 64 bolted to the lower casing 62.

Figure 4:
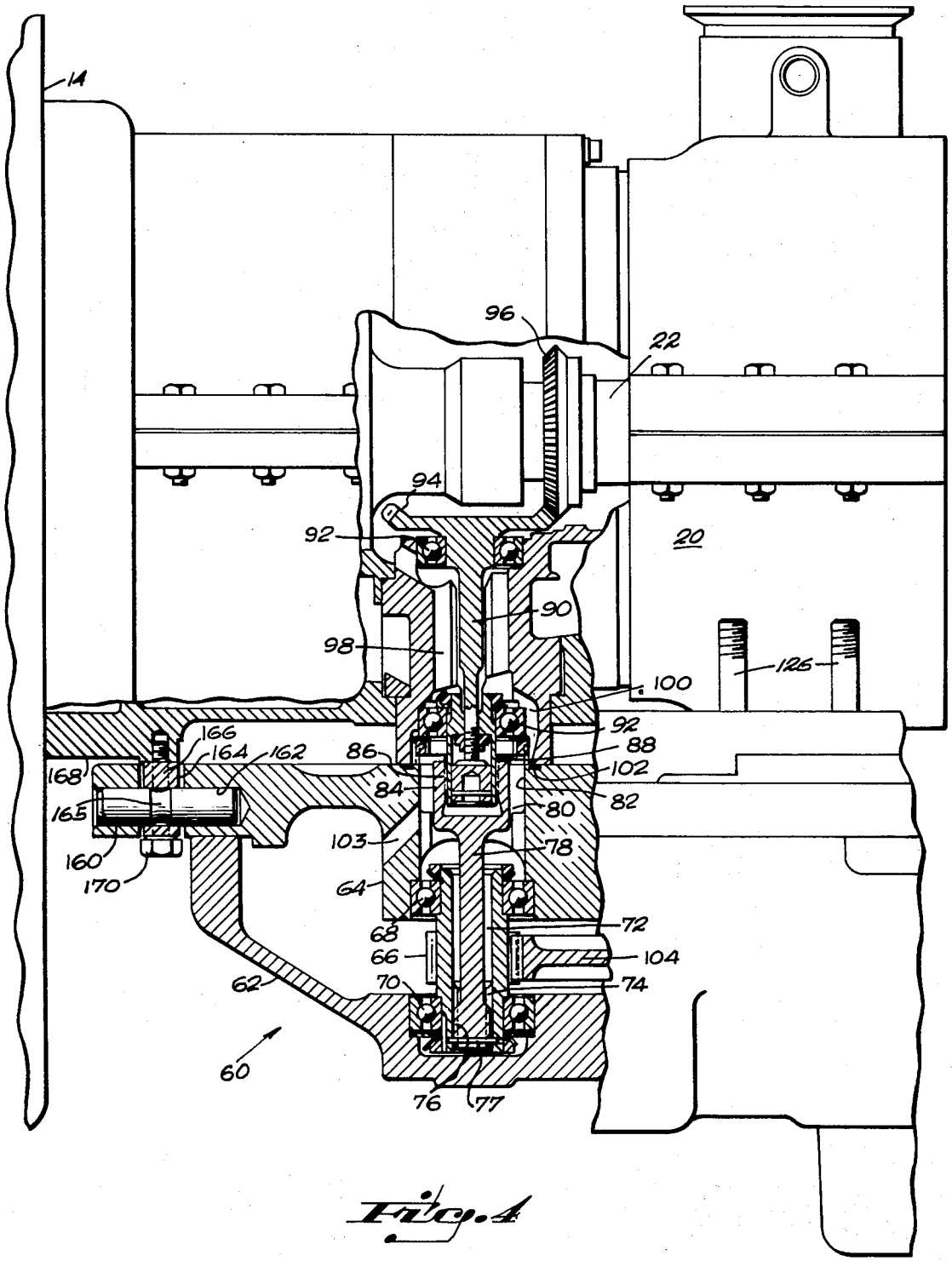
FIG. 4 is a greatly enlarged fragmentary view of the engine shown in FIG. 1 illustrating the connection between an accessory gear box and the engine.

As seen in FIG. 4, an input gear 66 is journaled in the gear box 60 by means of bearing assembly 68 and 70, mounted in casings 62 and 64, respectively. A bore 72 in the interior of gear 66 has a splined bottom portion 74 which receives the splined end 76 of an input shaft 78. Input shaft 78 is retained in bore 72 by pin 77. The upper end of shaft 78 is loosely received in a bore 80 leading to an upper recess 82 in cover 64. Shaft 78 has an expanded upper portion 84 having internal splines 86. Splines 86 are adapted to be telescoped over external splines 88 of an engine accessory output shaft 90. Output shaft 90 is journaled by means of a bearing assembly 92 mounted in the compressor casing 20. A bevel gear assembly 94 on the end of shaft 90 meshes with a corresponding bevel gear 96 on the compressor rotor 22. A limited amount of radial movement between the splined portion 88 of shaft 90 and the splined portion 74 of gear 66 is permitted by slightly increasing the tolerances between splines 74 and 76 and splines 86 and 88.

The interior of the gear box 60 is connected to the bearing areas of the engine 10 so as to provide a common lubrication system. For this purpose a series of ports 98 are positioned adjacent output shaft 90 and lead to a chamber 100 adjacent the junction between gear box upper cover 64 and the compressor housing 20. Chamber 100 connects with the corresponding chamber 82 in cover 64 of gear box 60. A suitable seal 102, which can slide axially, is provided between the chambers. Ports 103 lead from the chamber 82 into the interior of gear box 60.

Figure 5:
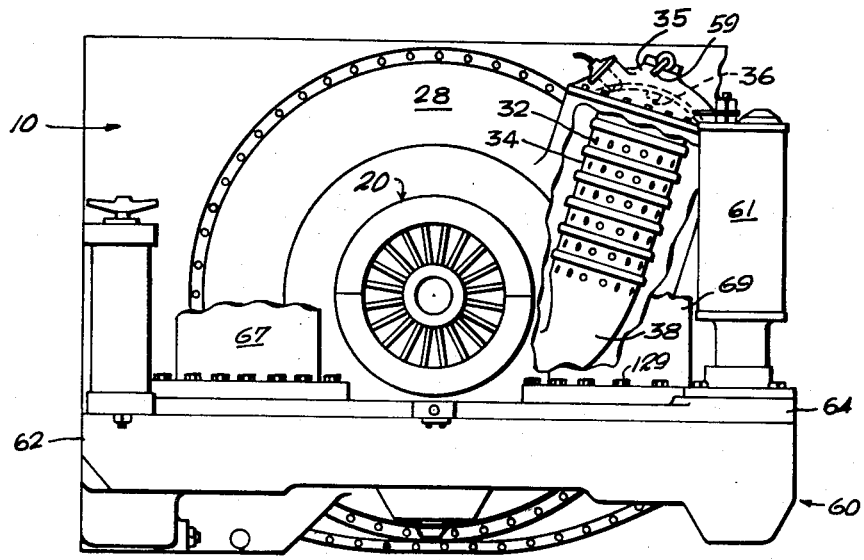
FIG. 5 is an enlarged view of the accessory gear box shown in FIG. 1, taken on lines 5—5 of FIG. 1.

As seen particularly in FIG. 5, spur gear 66 provides an input to a gear train journaled by siutable means on vertical axes in the gear box 60. The gear train comprises idler gears 104 which transmit the power from input gear 66 to a pair of accessory drive gears 106 and 108 for the hydraulic pump 67 and alternator 69, respectively. An additional gear 110 meshes with a gear 111 on accessory drive gear 106 and drives input gears 112 and 114 for oil pump assembly 65 and fuel pressurizing and scheduling unit 57, respectively. Another idler gear 104 engages accessory gear 108 for the alternator 69 and transmits power to accessory input gears 118 and 120 for the primary starter 61 and auxiliary starter 62, respectively.

The accessory drive gears 106, 108, 118, 114 and 120 have internally splined openings 122 adapted to receive input splines for their corresponding accessories.

Figure 7:
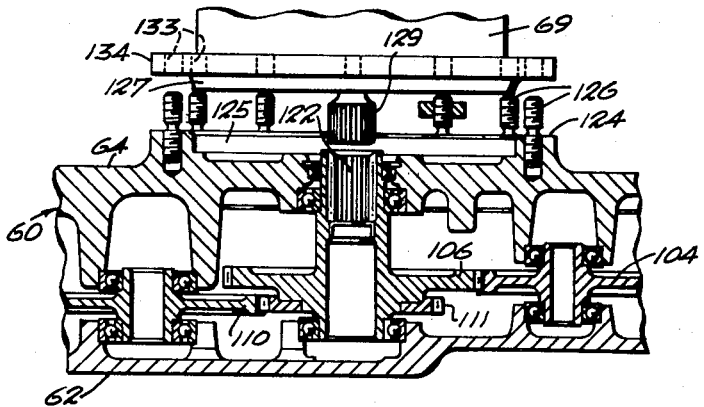
FIG. 7 is a partial section view of FIG. 5 taken on lines 7—7 of FIG. 5.

As seen in FIG. 7, a circular mounting pad 124 surrounds the splined opening 122 for gear 108. A series of studs 126 are positioned around the mounting pad 124. A recess 125 having a beveled outer edge is formed between the mounting pad 124 and the splined opening 122. The recess 125 and studs 126 form respective guides for a base 127 and openings 133 in a flange 134 for accessory 69. An externally splined input shaft 129 for accessory 69 is received in splines 122 when flange 134 abuts mounting pad 124. Nuts 129 are threaded on studs 126 to enable rapid detachable mounting of accessory 69 on accessory gear box 60.

The gears 106, 118, 120 and 144 also have mounting pads 128 and recesses onto which their corresponding accessory is detachably mounted by bolts or studs and nuts. A detailed description of these components is not undertaken because their mounting arrangement is similar to that for gear 108 which has been described in detail above.

Figure 6:
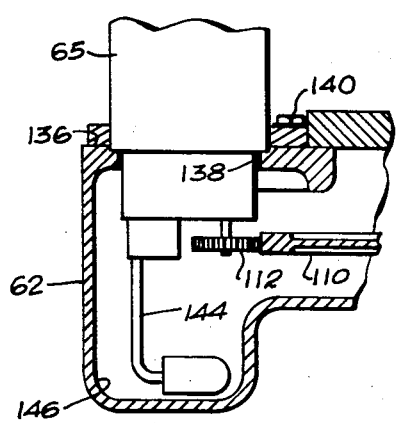
FIG. 6 is a partial section view of FIG. 5 taken on lines 6—6 of FIG. 5.

A mounting pad 136 surrounds an opening 138 adjacent gear 110. As seen particularly in FIG. 6, the oil pump assembly 65 is adapted to be detachably secured on mounting pad 136 by bolts 140. The drive gear 112 for pump 65 has straight spur gears adapted to engage gear 110 and be displaced axially relative to gear 110 so that the pump 65 may be removed vertically as a unit from gear box 60. A pump inlet assembly 144 is positioned in a recess 146 in lower casing 62 so as to provide a sump chamber for gear box 60.

As seen in FIG. 5, the aft end of the gear box 60 is mounted to the engine by a pair of spaced ears 150 formed on the lower portion of the combustor housing 28. The ears 150 receive pins 152 positioned laterally with respect to the axis of rotation of the engine 10. Pins 152 are received in openings in spaced projections 154 provided in gear box cover 64. Pins 152 are suitably retained in projections 154 to enable easy removal. A series of spaced projections 156 and 158 on the combustor housing 28 and gear box cover 64 respectively provide a means for laterally positioning the central portion of the gear box 60. There is a sufficient gap between the ears 150 and projections 154 to permit lateral expansion of the outboard portions of the combustor housing.

As seen in FIGS. 4 and 5, the forward end of the gear box 60 is mounted to the engine by means of a pin 160 which is slidingly received in axially directed bores 162 formed in a lateral slot 164 in the forward portion of the gear box cover 64. Pin 160 is sandwiched between mounting brackets 166 and a mounting pad 168 on the compressor housing 20 by means of bolts 170. A circumferential recess 165 in pin 160 causes the pin 160 to be axially locked by bolts 170. A sufficient clearance is provided between brackets 166 and slot 164 to permit axial displacement of the forward portion of the gear box cover 64 relative to the compressor mounting pad 168.

During operation of engine 10 the compressor housing 20 in the gear box 60 may expand at different rates. The mounting at the aft portion of gear box 60 permits free lateral expansion of the outboard portions of the gear box relative to the combustor housing 28 but maintains the aft part of gear box 60 in a fixed axial position. The mounting at the forward end of the gear box 60 permits free fore and aft expansion but fixes the lateral position of the gear box 60 with respect to the compressor casing 20. The positioning projections 156 and 158 limit the lateral movement of the central portion of the aft end of gear box 60 to minimize bending stresses on pin 162. With this arrangement free thermal expansion of the gear box 60 relative to the engine 10 is permitted, thereby minimizing any buildup of stress. Since the aft portion of the gear box 60 is fixed in an axial position but is axially displaced from input gear 66, there is a slight amount of displacement of the axis of gear 66 relative to the axis of accessory output shaft 90. Whatever slight amount of expansion occurs is taken up by a quill shaft 78.

Removal and installation of the gear box 60 as a unit from the engine 10 is greatly facilitated by the mounting provision shown because the ears 150 and projections 154, when the pins 152 are installed, act as a hinge to permit the forward portion of gear box 60 to be swung down or into position at the forward end of compressor housing 20. The forward portion is mounted simply by inserting pin 160 into holes 162 and tightening bolts 170 to mount pin 160 in place on mounting pad 168.

Because the mounting pads for the accessories are horizontally positioned, the accessories are easily placed on the mounting pads by an operator and simply held there by gravity during detachable mounting. This greatly facilitates the removal and installation of accessories when there is only vertical access to the engine, such as in a tank. In addition, the tangential combustor assembly 34 has an end cap 35 which opens in an upward direction so that the combustor end cap may be removed and the entire interior portion of perforated can 34 may be inspected without removal of the engine from the vehicle. In addition, the vertically directed intake and exhaust 16 and 58 enable positioning of the engine in extremely cramped quarters.

It is apparent that the engine structure as described above may be employed in vehicles other than those specifically described above and that other accessories may be employed with equal advantage. Therefore, the spirit and scope of the present invention is to be determined solely by the following claims.

What is claimed as novel and desired to be secured by Letters Patent of the United States is:

1. An accessory gear box assembly for a gas turbine engine, having at least one rotor assembly journaled in an annular housing for rotation about a generally horizontal axis, said gear box assembly comprising:
   a casing positioned underneath and projecting from both sides of said housing and having an upper generally horizontal cover;
   an input gear journaled in said casing and means for driving said input gear from said rotor assembly;
   a plurality of gears driven by said input gear and journaled in said gear box for rotation about a vertical axis;
   means for detachably mounting accessories on said horizontal cover for driving engagement with said gears, whereby said accessories are maintained on said horizontal surface by gravity during detachable mounting thereof; and
   spaced connections on said gear box assembly mounting it to said engine, at least one of said connections fixing said gear box assembly relative to said engine and the other connections permitting limited movement, thereby permitting said engine and said gear box to expand thermally independent of one another.

2. An accessory gear box as in claim 1 wherein said mounting means comprises a pair of mounting connections positioned at the aft end of said gear box restraining it relative to said engine in a vertical and axial direction only, thereby permitting limited sidewise movement and a third mounting connection positioned away from said first-mentioned mounting points for permitting vertical and axial movement only relative to said engine.

3. An accessory gear box as in claim 2 wherein:
   said aft mounting connections comprise laterally positioned pins supporting the aft end of said gear box and adapted to receive laterally directed openings on a mounting point on said engine;
   said third mounting connection comprises a pin positioned in a fore and aft direction and slidably engaging a fore and aft hole in said gear box, said pin being adapted to be fixed relative to said engine.

4. An accessory gear box as in claim 3 further comprising means for limiting the lateral deflection of the central portion of the aft end of said gear box.

5. An accessory gear box as in claim 1 wherein said means for detachably mounting said accessories on said horizontal cover comprises:
   internally splined drive gears positioned to receive an externally splined input shaft for an accessory;
   a mounting pad and plurality of studs surrounding said internally splined shaft so as to provide a guide for accessories fitted onto said horizontal surface.

6. An accessory gear box as in claim 5 further comprising:
   a lubricating pump adapted to provide lubricating fluid to said accessory gears;
   an opening in the horizontal cover of said gear box over which said lubricating pump is placed and a sump chamber in line with said opening; and
   means for detachably mounting said pump to said cover so that said pump may be mounted in said chamber for driving connection with said gear train and removed from said opening in the horizontal cover.

7. An accessory gear box as in claim 6 wherein said detachable mounting means comprises spur gears on said lubricating pump and said gear train intermeshing so that said lubricating pump is driven by said gear train spur gear when said pump is positioned in said sump and wherein said lubricating pump is permitted to be vertically removed from said sump.

8. A gas turbine engine comprising:
   an outer generally annular casing;
   at least one rotor assembly journaled for rotation in said casing about an axis generally coincident with the axis of said outer casing, said rotor assembly having a compressor assembly at one end for pressurizing air and a turbine assembly at the opposite end for being driven by a motive fluid stream;
   a tangential combustor assembly receiving pressurized air from said compressor for discharging a motive fluid stream across said turbine assembly, said tangential combustor having a generally cylindrical perforated can and nozzle assembly positioned so that they are directly vertically accessible from the upper portion of said casing;
   an accessory gear box having a power input from said rotor assembly and providing a plurality of driven outputs positioned on a horizontal cover positioned underneath and projecting from opposite sides of said casing;
   a plurality of accessories positioned on said gear box cover for detachable mounting in a vertical direction; and
   spaced connections on said gear box assembly mounting it to said engine, at least one of said connections fixing said gear box assembly relative to said engine and the other connections permitting limited movement, thereby permitting said engine and said gear box to expand thermally independent of one another.

9. A gas turbine engine as in claim 8 wherein said compressor assembly comprises an axial flow compressor and said engine further comprises an inlet chamber at the inlet end of said compressor having a semicircular shape so that a vertically directed inlet is provided for said engine.

10. A gas turbine engine as in claim 9 further comprising an annular heat exchanger receiving the discharge from said turbine and compressor assembly and a semi-cylindrical chamber encasing said annular heat exchanger so that a single vertically directed exhaust is provided.

11. A gas turbine engine as in claim 1 wherein said connections comprise:
   a pair of ears positioned on said engine casing adjacent the aft end of said gear box;
   a pair of spaced projections extending from the aft end of said gear box to form slots in which said ears are received;
   pins mounted on said aft projections and slidably extending through said ears, said pins being positioned along a lateral axis relative to said engine so as to permit free lateral expansion of the aft end of said gear box relative to said engine;
   a pin positioned on the forward end of said gear box in a direction parallel to the axis of rotation of said engine, said pin being slidably received in openings in the forward end of said gear box; and
   means for mounting said pin to the forward end of said engine casing thereby permitting free thermal expansion in a fore and aft direction of the gear box relative to said casing.

12. A gas turbine engine as in claim 11 further comprising:
   internally splined shafts journaled in said gear box through the upper side thereof to receive the input shaft of an accessory;

mounting pads surrounding said splined shafts; and means for detachably mounting said accessories onto said mounting pads.

References Cited

UNITED STATES PATENTS

| | | | |
|---|---|---|---|
| 1,930,025 | 10/1933 | Vincent | 123—195 A |
| 1,818,643 | 8/1931 | Nieman | 74—655 GA |
| 3,088,278 | 5/1963 | Franz | 60—39.16 R |
| 3,208,217 | 9/1965 | Sonder | 60—39.31 |
| 3,267,674 | 8/1966 | Collman | 60—39.51 H |
| 3,386,242 | 6/1968 | Trapp | 60—39.16 R |

FOREIGN PATENTS

| | | | |
|---|---|---|---|
| 590,419 | 7/1947 | Great Britain | 60—39.31 |

CARLTON R. CROYLE, Primary Examiner

R. E. GARRETT, Assistant Examiner

U.S. Cl. X.R.

60—39.32